No. 720,852. PATENTED FEB. 17, 1903.
F. W. SMITH, Jr.
GOLF BALL.
APPLICATION FILED JAN. 6, 1903.
NO MODEL.

WITNESSES:
H. A. Lamb.
M. J. Sougden

INVENTOR
Fred W. Smith Jr.
By J. W. Smith Jr.
ATTORNEY

UNITED STATES PATENT OFFICE.

FRIEND W. SMITH, JR., OF BRIDGEPORT, CONNECTICUT, ASSIGNOR TO HOLDREGE COMPANY, OF NEW YORK, N. Y., A CORPORATION OF NEW JERSEY.

GOLF-BALL.

SPECIFICATION forming part of Letters Patent No. 720,852, dated February 17, 1903.

Application filed January 6, 1903. Serial No. 138,054. (No model.)

*To all whom it may concern:*

Be it known that I, FRIEND W. SMITH, Jr., a citizen of the United States, residing at Bridgeport, in the county of Fairfield and State of Connecticut, have invented certain new and useful Improvements in Golf-Balls; and I do hereby declare the following to be a full, clear, and exact description of the invention, such as will enable others skilled in the art to which it appertains to make and use the same.

My invention relates to certain improvements in the manufacture of golf-balls, and has for its object to provide a ball in which the component parts shall be securely fastened together, so that there can be no likelihood of the cracking or peeling of the outside jacket, while at the same time a substantial and satisfactory coating of paint may be utilized.

With these ends in view my invention consists of certain details of construction and combination of parts, such as will be hereinafter fully set forth and then specifically be designated by the claims.

Figure 1:
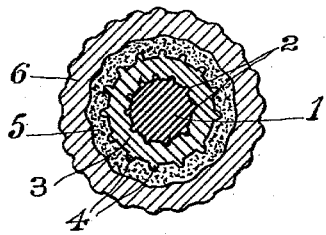
Figure 2:
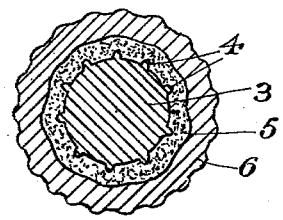
Figure 3:
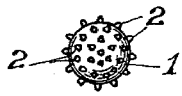
Figure 4:
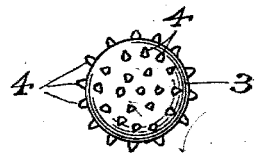

In the accompanying drawings, which form a part of this application, Figure 1 is a sectional elevation of my improved ball in its preferred form; Fig. 2, a similar view of a modified form of my improvement; Fig. 3, a detail elevation of the innermost core, and Fig. 4 a detail elevation of my ball as it appears before the fibrous or textile substance is applied.

Similar numbers of reference denote like parts in the several figures of the drawings.

My invention has particular reference to the style of golf-ball known as the "rubber" ball, as distinguished from the "gutta-percha" ball. Heretofore players using the rubber ball have experienced considerable annoyance owing to the cracking or peeling of the outside jacket and also because such ball did not properly hold the coating of paint. It is a well-known fact that rubber and gutta-percha will, if undercured even to a slight degree, not unite, and when a gutta-percha outside jacket is applied to a rubber ball there will be more or less of an air-space between the rubber and the gutta-percha; also, in applying this gutta-percha outside jacket the rubber will flow outwardly, owing to the great pressure placed upon the molds, and the surface of the outside jacket will therefore be a composition of matter composed of gutta-percha and rubber, and this outside surface will not hold a coating of paint as well as a gutta-percha surface. My invention obviates these difficulties and will be best understood from the following description.

1 is an internal core of any suitable material, such as gutta-percha, which has small protuberances 2 extending from its surface, and 3 is a rubber covering, which is molded under pressure directly upon said core and so as to completely surround the same, and this rubber covering is likewise provided with protuberances 4, which project from its surface. This rubber surface is covered with a suitable material 5, such as silk, and this silk may be applied in any form and in any manner. Silk thread or twist may be wound around this rubber surface, or the latter may be covered with a coating of rubber-cement and a piece of silk fabric or a mass of silk flock applied thereon.

6 is the outside gutta-percha covering, which is applied directly to the surface of silk and is molded thereto under great pressure.

Gutta-percha has a great affinity for fibrous or textile materials and particularly for silk, and the object of the application of silk is to cause the outside gutta-percha jacket to be firmly and immovably secured, so that there can be no likelihood of the cracking or peeling of said jacket.

The object of the protuberances 4 upon the rubber covering 3 is to increase the resiliency of the ball as a whole and also to afford a good anchorage for the silk covering.

It is not absolutely necessary that the internal core 1 should be employed, although the weight of the ball can be easily regulated by employing a core of this sort. When such a core is used, I prefer to form protuberances 2 thereon in order to obtain a good anchorage for the rubber covering 3; but I do not wish to be limited to the employment of this core, since it is not absolutely necessary.

When the silk is wound around the rubber covering 3, it will not be necessary to use any cement; but the rubber surface must be rendered tacky in case a silk fabric or silk flock is utilized. I prefer a winding of silk around the rubber, because I obtain thereby a more compact covering of silk. While I am enabled to obtain a trifle more resiliency by providing the protuberances 4 upon the rubber covering, I do not wish to be limited thereby, since the silk may be also applied to a perfectly plain rubber surface and good results obtained.

Since the gutta-percha covering 6 is applied directly to the silk, there will be no interfusion between the gutta-percha and the rubber, even if the latter be undercured, and therefore the full benefit of the gutta-percha so far as the coating of paint is concerned will be obtained.

Having thus described my invention, what I claim as new, and desire to secure by Letters Patent, is—

1. A golf-ball having a rubber body provided with protuberances throughout its circumferential area, a fibrous substance applied around said body, and an external gutta-percha covering molded under pressure directly to said fibrous substance, substantially as set forth.

2. In a golf-ball composed of rubber and gutta-percha, the combination with the rubber and gutta-percha elements, of silk interposed between said elements, substantially as set forth.

3. In a golf-ball, the combination of a rubber body having throughout its circumferential area high and low points, a covering of silk enveloping said rubber body, and an outside covering of gutta-percha molded under pressure directly to said envelop of silk, substantially as set forth.

4. In a golf-ball, the combination of the rubber body having protuberances extending from its circumferential area, an envelop of silk completely covering said area, and an outside jacket of gutta-percha molded under pressure directly to said silk envelop, substantially as set forth.

In testimony whereof I affix my signature in presence of two witnesses.

FRIEND W. SMITH, JR.

Witnesses:
M. T. LONGDEN,
C. T. A. MEEK.